United States Patent Office 3,721,641
Patented Mar. 20, 1973

3,721,641
FLEXIBLE VARNISH
James A. Whitt, Fort Wayne, Ind., assignor to
General Electric Company
No Drawing. Filed Feb. 25, 1971, Ser. No. 119,018
Int. Cl. C08g 37/18
U.S. Cl. 260—33.4 EP                    10 Claims

ABSTRACT OF THE DISCLOSURE

An electrically insulating varnish characterized as having flexibility and long shelf life is composed of a polyester resin and epoxy resin wherein the weight ratio of polyester resin to epoxy resin is about 1.8:1, and phenolic resin, the phenolic resin being present to the extent of about 13 weight percent.

BACKGROUND OF THE INVENTION

It is highly desirable that varnishes and resins which are to be used as electrical insulating materials have long-term flexibility and stability and be able to withstand sudden changes in temperature without becoming embrittled. Specifications desired in such varnishes and resins include such requirements as retention of at least 25% elongation after aging at 155° C. for 1600 hours. In addition, a varnish or resin which meets performance specifications must be composed of materials which are readily obtainable at reasonable prices in order to be competitive in the marketplace.

SUMMARY OF THE INVENTION

It is an object of the present invention to provide an improved electrically insulating varnish or resin which will remain flexible over a long period of time at elevated temperatures.

It is another object of the present invention to provide a varnish or resin which does not undergo a significant reduction in properties during long-term storage.

Another object of the invention is to provide an electrically insulating varnish which is heat curable in thin films.

Another object of the invention is to provide an electrically insulating varnish suitable for use in combination with a wide variety of other insulating materials.

The varnish comprises a polyester resin and an epoxy resin in which the weight ratio of the polyester resin to the epoxy resin is held within a certain range. A phenolic resin is also present as a necesary part of the composition. It is desirable that a small proportion of catalyst and wetting agent be present also. A number of solvents as described hereinafter are available for the varnish.

DESCRIPTION OF THE PREFERRED EMBODIMENT

The flexible varnish of this invention is prepared by a mixing process. The polyester, epoxy, and phenolic resins are mixed together in their correct proportions. Solvent is then added and the batch blended until a clear homogeneous solution is obtained. The curing catalyst and wetting agents are then blended into the mixture.

The following examples are typical of compositions made in accordance with this invention:

EXAMPLE 1

Polyester resin (54.2% by weight), epoxy resin (30.5% by weight) and sufficient phenolic resin to cure, in this case 13.8% by weight, were blended in a solvent consisting of 45 parts by volume of xylene, 35 parts by volume of denatured alcohol and 20 parts by volume of naphtha until a clear homogeneous solution was produced. A tin octoate curing catalyst (1.0% by weight) and a wetting agent (0.5% by weight) consisting of a silicone resin were then blended into the solution.

EXAMPLE 2

Polyester resin (30% by weight), epoxy resin (60% by weight), and phenolic resin (10% by weight) were blended in a solvent consisting of equal parts by volume of xylene and butanol until a clear solution was produced. A curing catalyst (1½% by weight) and a wetting agent (1% by weight) consisting of a silicone resin were then blended into the solution.

EXAMPLE 3

Polyester resin (60% by weight), epoxy resin (20% by weight), and phenolic resin (20% by weight) were blended into a solution consisting of 65 parts by volume of xylene and 35 parts by volume of denatured alcohol until a clear homogeneous solution was produced. A curing catalyst (0.5% by weight) and a wetting agent (0.5% by weight) consisting of a silicone resin were then blended into the solution.

The varnishes of this invention combine flexibility with thermal stability at moderately high temperature. Shelf life stability is excellent. For example, after nine weeks in a sealed container, no significant change in the viscosity of the varnish of Example 1 was noted.

Solvent systems for the flexible varnish of this invention require the presence of a fairly active solvent to dissolve the phenolic resin. In addition, the solvent should be one which promotes compatibility between the varnish and the substrate to which it is applied. While the varnish is designed particularly for application to magnet wire it may also be advantageously applied to the stator cores of electric motors.

Solvent systems (in addition to those set forth in the examples) which have proved to be satisfactory are a 50:50 mixture of methylisobutylketone-xylene, a 50:50 mixture of diacetone alcohol-xylene, and a mixture consisting of 50 parts by volume of xylene, 25 parts by volume of Cellosolve acetate and 25 parts by volume of denatured alcohol. In view of the wide selection of acceptable solvents, the solvent system generally used is the inexpensive one set forth in Example 1. This is a preferred system.

While polyester, epoxy and phenolic resins are, in general, usable in the practice of this invention, these resins are available in a wide variety of grades and types. Accordingly, information concerning particular grades and types tested is given herewith with the understanding that such information is illustrative and not limiting.

A preferred polyester is 3339 Permafil sold by the General Electric Company. This polyester resin is formulated by reacting 11.0 moles of adipic acid, 1.0 mole of maleic anhydride and 12.6 moles of propylene glycol. The reaction is continued with the application of heat until the solution has a viscosity of 80–125 centipoises.

A preferred epoxy resin is Araldite CY-178 sold by the Ciba Company. This epoxy resin has the following structure:

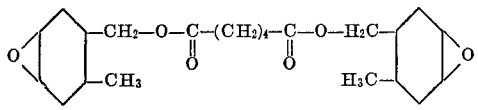

The specifications of Araldite CY-178 are given below:

| | |
|---|---|
| Typical viscosities, cps.: | |
| at 25° C. (77° F.) | 725–875 |
| at 40° C. (104° F.) | 250 |
| at 80° C. (176° F.) | 40 |
| at 120° C. (248° F.) | 10 |
| Epoxy value, eq./100 gm. | 0.46–0.48 |
| Weight per epoxide | 205–216 |
| Color, Gardner (max.) | 1 |
| Weight per gallon, lb. | 9.4 |
| Flash point, ° F. (open cup) | 490 |
| Vapor pressure, at 200° C. (392° F.), mm. Hg | 1 |

A preferred phenolic resin is a standard phenol-formaldehyde condensation polymer sold by the General Electric Company under the designation Methylon 75108. This phenolic resin has the following structure:

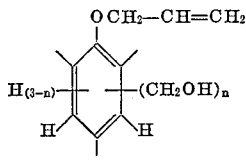

where $n$ is an integer of from 1 to 3. The Methylon 75108 resin is described in U.S. Pats. Nos. 2,579,320, 2,579,330, 2,579,331, 2,598,406, 2,606,929, and 2,606,935 issued to R. W. Martin and assigned to the assignee of the present invention. The resins are essentially a mixture of the allyl ethers of mono-, di-, and tri-methylol phenols. The specifications for Methylon 75108 are as follows:

| | |
|---|---|
| Percent reactive (weight-avg.) | 98. |
| Percent solids (weight) | 84–89 (2–3 gram sample, 45 min. at 125° C.). |
| Solvent | None. |
| Viscosity at 25° C. (77° F.): | |
| Gardner-Holdt | Y ½–Z 2½. |
| Centipoises | 2000–4000. |
| Color | Clear dark brown. |
| Pounds per gallon—avg. | 9.7. |
| Flash point—Tag closed cup—° F. | 200. |
| Free water content—percent | 0–2. |

A preferred curing catalyst is tin octoate having a stannous tin concentration of about 28%. Such a material is sold by the Nuodex Division of Tenneco Chemicals, Inc. under the designation Nuocure 28.

A preferred wetting agent for use in this invention is a methyl siloxane polymer sold by the General Electric Company under the designation SR–82. When added in amounts of about 1% based upon epoxy resin content this silicone acts as an effective flow control agent and wetting agent.

The varnishes of this invention have properties greatly superior to those of varnishes commonly used on wound stators. For example, after 1600 hours at 155° C. free films of the varnish of Example 1 retained in excess of 40% elongation. This compares with varnishes commonly used none of which exhibit an elongation in excess of 10% after about one week at 155° C.

While the invention has been described with reference to certain specific embodiments, it is understood that there may be variations in formulations which still fall within the proper scope of the invention. Accordingly, the invention should be limited in scope only as may be necessitated by the scope of the appended claims.

What we claim as new and desire to secure by Letters Patent of the United States is:

1. A flexible, thermally stable, varnish composition comprising the mixture of:
   (a) from at least about 30 to about 60 percent by weight of an unsaturated flexible polyester resin obtained by heating a mixture of adipic acid, maleic anhydride and propylene glycol in the molar ratio of about 11:1:12.6;
   (b) from at least about 20 to about 60 percent by weight of an epoxy resin having the formula

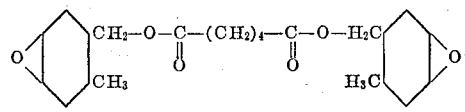

(c) and from at least about 10 to about 20 percent by weight of a phenolic resin having the formula

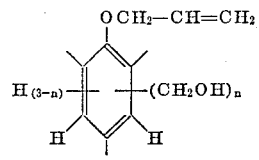

where $n$ is an integer of from 1 to 3; the weight ratio of said polyester resin to said epoxy resin being between about 1:2 and about 3:1.

2. A flexible varnish as claimed in claim 1 containing about 1 percent by weight of a catalyst and about one-half of one percent by weight of a wetting agent.

3. A flexible varnish as claimed in claim 2 in which the catalyst is stannous octoate and the wetting agent is a silicone resin.

4. A varnish as claimed in claim 1 dissolved in a solvent.

5. A varnish as claimed in claim 4 in which the solvent is a mixture of xylene, denatured alcohol, and naphtha.

6. A varnish as claimed in claim 5 in which the solvent is about 45 parts by volume xylene, about 35 parts by volume denatured alcohol and the remainder naphtha.

7. A varnish as claimed in claim 1 in which the polyester resin is about 54 percent by weight, the epoxy resin is about 30 percent by weight and the phenolic resin is not less than 12 percent by weight.

8. A varnish as claimed in claim 7 which contains about 1 percent by weight of a catalyst and about one-half of one percent by weight of a wetting agent.

9. A varnish as claimed in claim 7 dissolved in a solvent.

10. A varnish as claimed in claim 9 in which the solvent is about 45 parts by volume xylene, about 35 parts by volume denatured alcohol, and the remainder naphtha.

References Cited

UNITED STATES PATENTS

| | | | |
|---|---|---|---|
| 3,245,925 | 4/1966 | Watson | 260—831 X |
| 3,551,517 | 12/1970 | Dowbenko et al. | 260—33.6 EP X |

OTHER REFERENCES

Modern Plastics Encyclopedia—1968, McGraw-Hill, September 1967, vol. 45, No. 1A, p. 494.

General Electric, "Methylon Resins" booklet, CDG-418B (2500; December 1967), 32 pages.

MORRIS LIEBMAN, Primary Examiner

S. M. PERSON, Assistant Examiner

U.S. Cl. X.R.

260—33.6 EP, 831